United States Patent Office 2,704,750
Patented Mar. 22, 1955

2,704,750

AMINOPLAST RESINS

Lynwood N. Whitehill and James A. Arvin, Homewood, Ill., assignors to The Sherwin-Williams Company, Cleveland, Ohio, a corporation of Ohio No Drawing. Application July 3, 1951,
Serial No. 235,112

11 Claims. (Cl. 260—67.6)

This invention relates to a method for improving the quality of oil soluble aminoplast resinous condensation products useful in baking finishes by including therein either before or after their formation certain latent curing catalysts.

More particularly, the invention relates to a method of improving an alkylated amino-aldehyde resinous condensation product by incorporating with the composition catalytic amounts of a sulfocarboxylic acid ester having two carbon atoms alpha and beta to the carbon atom of an esterified carboxyl group and a sulfonate group attached to one of said alpha-beta carbon atoms. These esters may be derived by esterifying a monobasic or dibasic carboxylic acid having carbon to carbon usaturation in the position alpha-beta to the carboxyl group or groups and introducing a sulfonate group on one of the alpha or beta carbon atoms where the unsaturation occurs. The catalysts employed, therefore, are characterized by a sulfur linkage to a carbon atom in one of the positions alpha and beta to an esterified carboxyl group. If the ester is derived from a dibasic acid, it may be a monoester, that is, only one of the carboxyl groups need be esterified, or it may be a diester in which both of the carboxyl groups are esterified.

The catalysts which are desirable for the purpose of this invention are neutral and unreactive toward the aminoplast solution at ordinary baking temperatures below 212 degrees F. and yet are sufficiently unstable to decompose under normal baking temperatures, 250 degrees F. to 400 degrees F. preferably, to give off an acidic material which will hasten and extend the curing of the resin without causing any noticeably bad effects upon the finished film.

As illustrations of typical acids from which the sulfo esters may be derived, there may be mentioned aconitic acid, itaconic acid, glutaconic acid, citraconic acid, fumaric acid, maleic acid, and the higher homologues of these acids. The ester groups may be formed by esterifying the carboxyl group of the unsaturated acid with any of the alcohol esterifying agents, such as, for example, methanol, ethanol, propanol, butanol, allyl alcohol, amyl alcohol, hexanol, cyclohexanol, octanol, decanol, lauryl alcohol, undecenyl alcohol, furfuryl alcohol, tetrahydrofurfuryl alcohol and other homologous monohydric alcohols. The esterifying agent may also be a phenol, e. g., phenol, alpha naphthol, ortho-, meta-, or paracresol, or homologous phenols. The esterifying agent may also be an aralkyl alcohol as, for example, benzyl alcohol and homologues thereof. Instead of a monohydric alcohol, the esterifying agent may be a polyhydric alcohol or a glycol, such as, for example, ethylene glycol, diethylene glycol, propylene glycol, dipropylene glycol, butylene glycol, and the higher homologues having recurring alkylene groups in a linear chain, preferably one to nine of such groups. The least number of carbon atoms in the catalyst is four.

The sulfonate group may be added to the molecule at the unsaturated bond by sulfonation reactions or by the bisulfite addition reaction. Such reactions are well known in the art and are described in U. S. Patent 2,028,091 and a number of other patents, as well as in various text books. The metallic portion of the sulfonate group is preferably an alkali metal or the ammonium ion, but may be an alkaline earth metal, e. g., calcium, barium or strontium, or another metallic ion such as magnesium, or a heavy metal ion such as zinc.

The preferred catalysts are the water soluble sulfonate succinate esters. The preferred sulfosuccinate esters are soluble in water, alcohol and hydrocarbon mixtures. The extent of the solubility, however, does not appear to be a critical factor because the amount required is extremely small. Thus, dibutyl sulfosuccinate sodium salt has practically no solubility in benzene and kerosene yet it is somewhat soluble in the xylenebutanol mixture currently used for alkylated urea and melamine resins and performs just as well as the soluble dioctyl sodium sulfosuccinate. The dibutyl ester has limited solubility in acetone, olive oil and glycerine. It is soluble in pine oil and maleic acid. Some oil solubility is desirable but since only small amounts are required only slight solubility is necessary. The preferred catalysts for the purpose of the invention have the following structural formula:

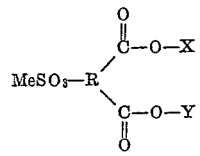

Me is selected from the group consisting of ammonia and salt forming metal ions, R is a saturated aliphatic group, e. g., an aliphatic hydrocarbon group in which one hydrogen atom has been substituted for by the sulfonate group, but free from other substituents, the sulfonate group being linked to a carbon atom alpha or beta with respect to the groups —COOX and —COOY, and X and Y are selected from the group consisting of nonsubstituted and hydroxyl substituted alkenyl, alkyl, aryl and alkaryl hydrocarbon groups. The radicals X and Y preferably contain 3 to 12 carbon atoms, inclusive. The dialkyl sulfoalkali metal and ammonium succinates having 3 to 8 carbon atoms in the alkyl groups are preferred.

The sulfoesters of succinic acid and their salts may be illustrated by the following general formula

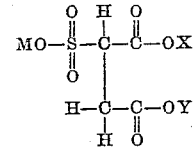

wherein M is a salt-forming group, e. g., an alkali metal or ammonium ion and X and Y are hydrocarbon or hydroxy hydrocarbon groups, preferably alkyl. In the monoesters one of the groups X and Y is hydrogen. Compounds within the scope described are illustrated and claimed in U. S. Patent 2,028,091.

Amino-aldehyde resins are a well-known class of polymers. The amino groups essential thereto are supplied by a variety of related compounds having as a characteristic common to the group possession of more than one functional amino group. Included among the useful compounds are urea, thiourea, dicyandiamide, guanidine, melamine, melam, ammeline, thioammeline, B—B' bisthioammeline diethyl ether, 2,6-diamino-1,3-diazine, 5 - methyl-2,6-diamino-1,3-diazine, 4-chloro-2,6-diamino-1,3-diazine and mixtures of said compounds. The preferred compounds of the group are urea, melamine and dicyandiamide. Some of the named group are included in the generic term "polyamino diazines" and "polyamino triazines."

Aldehydes which may be employed include acetaldehyde, benzaldehyde, butyraldehyde, formaldehyde, furfuraldehyde, and mixtures thereof, but the preferred aldehyde is formaldehyde. Other aldehydes such as crotonaldehyde are less commonly employed.

The source of the formaldehyde may be an aqueous solution, e. g., formalin, or may be from one of its polymeric forms, e. g., paraformaldehyde, which yield formaldehyde under the conditions of the reaction.

The ratio of the amino compound to aldehyde in the reaction mixture may be varied as is known in the art depending upon the qualities desired in the final product. In general, the number of moles of aldehyde employed is based upon the number of reactive or functional amino groups in the selected amino compound. In the case of urea-formaldehyde condensations, as high as three moles of formaldehyde to one of urea may be employed, but it is preferable to use a somewhat lower amount, e. g., between 2.5 and 2 moles of formaldehyde per mole of urea. When the amino compound is of greater functionality, such as in melamine-formaldehyde condensations, it is generally desirable that the ratio of formaldehyde to melamine be betwen 6:1 and 3:1, although in a given condensation to obtain specific properties it may be desired to use ratios outside the limits above described.

By reference to the reactive amino groups, the molal ratios of aldehyde to amino groups has been found to be in the ratio of from 1:2 to 2:1 in the amino-aldehyde resinous compositions of present-day usage.

It is within the scope of the invention that the amino-aldehyde resins described be modified in composition with drying and semi-drying oil modified alkyd resins of the class commonly employed in protective and decorative coatings. To obtain certain desired qualities it may also be desirable to modify the amino-aldehyde resins with alkyl phenol-aldehyde resins. Other plasticizers may be used to alter the final character of the product and the above-described modifiers may be incorporated by formation in situ, or may be added after the amino-aldehyde reactants have been condensed to a polymeric state prior to final conversion to less soluble states.

The resin condensates described herein are to be employed in the protective coatings field and are to be used in solution in organic solvents, or in drying oil modified synthetic and natural varnish resins, and it is, therefore, desirable if not essential that the amino-aldehyde condensation be carried out in the presence of alcohols to promote solvent solubility. It is believed that the amino-aldehyde polymers form ethers through the residual alkylol groups of the resin reacting with the alcohol to release water and form ethers.

While butyl alcohol is preferred, other alcohols are acceptable and are employed, including the alcohols from methyl alcohol through octadecanol, i. e., having from one to 18 carbon atoms. Branched chain alcohols are also useful, isobutyl alcohol being commonly used.

In the practice of the invention, it is not essential that the resins of the type described be made by a process employing the catalyst during the actual resin manufacture, for the catalysts disclosed have been found to have the same order of effectiveness when included in the available amino-aldehyde resins of commerce in amounts based on the resin solids, as herein shown.

Amino-aldehyde resins are generally capable of further polymerization in the presence of heat, or heat and catalysts, to form solvent insoluble, infusible products and it is common practice in certain final application techniques to include acidic catalysts just prior to the application of heat in the curing step.

While it is advantageous to have the amine-aldehyde solution in conjunction with the curing catalysts, most of the known acidic materials when employed in combination cause polymerization reactions even at room temperatures, and the combinations are unstable upon storage.

This condition is particularly objectionable in cases where the amino-aldehyde resins are prepared in solution formulated for further application in protective coatings. Amino-aldehyde resins formulated for protective coatings, if too acidic, continue to polymerize upon storage and develop insoluble gel structures which render the compositions worthless.

From the above discussion, it can be seen that while it has been highly desirable to include in amino-aldehyde resins catalysts capable of causing reactions within the resinous composition under conditions of use, generally such catalysts as have been used, e. g., ammonium phosphate, alkyl acid phosphates, ammonium acid phosphates and benzoyl peroxide, have been disadvantageous because of instability upon storage of the resultant product, or deleterious effect of the catalyst upon the end use after storage.

Among the catalysts tested and found objectionable for one or more of the reasons indicated are chloroacetamide, chloroacetyl urea, ammonium oxalate, triethanolamine hydrochloride, dibenzyl oxalate, diammonium ethyl phosphate, sulfanilic acid and isobutyl benzene sulfonate.

Another disadvantage of many catalysts heretofore suggested, has been the lack of solubility of the catalyst in the amino-aldehyde resins. In liquid preparations of resins, insolubility of the catalyst in water or organic solvents introduces complexities in obtaining uniform dispersion of the catalyst in the first instance and in maintaining such uniformity within the composition after having once obtained it.

The preferred catalysts herein disclosed have the unique advantage that they are soluble in amino-aldehyde resinous compositions in the proportions necessary to obtain the result desired. They are soluble in both water and organic solvents and additionally their alkali metal and ammonium salts are practically neutral as to hydrogen ion concentration during storage so that the described resins containing them are characterized by stability over long periods. Upon later use of the catalyst-containing compositions at temperatures in excess of 225 degrees F., the catalysts break down to form acidic decomposition products which hasten the formation of insoluble infusible products. A further advantage accrues from the plasticizing effect in certain instances of the non-volatile decomposition products thus obtained. These catalysts have the additional advantage that when incorporated into anhydrous amino-aldehyde coating compositions, the stability of the compositions at ordinary room temperatures is not impaired over long storage periods, but upon heating to elevated temperatures above 225 degrees F., or when applying in thin films along, or in conjunction with other film forming solutions, and baking either in ovens or by radiant lamps at temperatures in excess of 225 degrees F., the resultant films have enhanced physical and chemical properties.

The effective range of percentage of catalyst in amino-aldehyde condensation products for convenience and practicality has been based upon the dry weight of the amino-aldehyde resin content of the formulation and the broad range of usefulness has been found to lie between 0.10% to 5% by weight of said resin present. Below 0.10% the degree of activity is not appreciable and above 5%, while the catalysts are effective, they are not sufficiently useful for applicants' purposes to compensate for the additional cost. The effectiveness of the above-described esters and their salts as catalysts depends in some measures upon the molecular weight of the ester chosen. The lower the molecular weight in general, the less the quantity required to obtain the desired effect. With the sodium salt of dioctyl sulfosuccinate (Aerosol OT), which is the preferred ester salt, the preferred range has been found to be within from 0.5% to 2%, based on the weight of the resin solids.

As previously stated, the catalyst may be cooked into the resin, or it may be combined with the resin already formed. It is within the scope of the invention that the said catalysts can be combined in the amino-aldehyde resinous condensation product at any time prior to the final heating operation wherein polymerization occurs to form a water insoluble volatile organic solvent soluble product. The anhydrous resinous solutions may be either clear or pigmented, or otherwise modified as is the custom in the coatings art wherein the resinous product is to be employed.

In a preferred application, which is the preparation of an alcohol modified urea-formaldehyde resinous condensation product for use in conjunction with other film-forming compositions, e. g., drying oil modified alkyd resinous varnishes, the catalyst is used in the actual resin formation to produce a product superior to similar prior art products but characterized by superior stability and shelf life over long periods of time.

So far as is shown, none of the prior art products have the inherent stability and yet the capacity to cure that have been achieved by the compositions herein disclosed. In the following examples, Example I illustrates a preferred embodiment of the invention. The other examples illustrate variations in the practice of the invention. The quantities are given in parts by weight unless otherwise specified.

EXAMPLE I

One hundred fifty-three parts of 37% formaldehyde solution (formalin) and 40 parts of paraformaldehyde were weighed into a 100 gallon reaction vessel equipped with a thermometer, agitator and reflux condenser and designed so that a vacuum of 50 mm. of mercury, or less, could be obtained within the vessel. The pH of the resultant mix was adjusted by the addition of small quantities of 10% caustic solution to a pH of 9.3. Following this adjustment 67.3 parts of urea was added and the mixture heated cautiously to 160 degrees F., and held for one hour with agitation. Two hundred parts of n-butanol and 14 parts of xylene were added after the initial alkaline reaction and the pH was adjusted to 3.5 with phosphoric acid. The reaction mixture was brought to reflux and the water present azeotropically removed.

After 2 hours of refluxing during which the organic solvent was returned to the reaction mixture, 67 additional parts of n-butanol was added and the distillation continued until the temperature of the reaction mass reached 226 degrees F. N-butanol was removed slowly by further distillation until the mass reached 253 degrees F., whereupon vacuum was drawn over the kettle and additional solvent recovered until the solids within the reaction mixture were approximately 67%. The vacuum was broken and the batch thinned with 67 parts of xylene. The yield was 274 pounds of resin of 46.8% non-volatile content having a viscosity of F(Gardner-Holdt) and an acid number with 10.9 pounds of solids per gallon of 8.45.

EXAMPLE II

An enamel was made by grinding 350 parts of titanium dioxide in 525 parts of an alkyd varnish containing 50% non-volatile material with 50% of the oil modified solids portion thereof being phthalic anhydride. This base was thinned with 240 parts of the urea-formaldehyde resinous condensation product of Example I to form a completed product. The enamel was then thinned to spraying viscosity and applied to bonderized steel test panels. The panels were baked at 300 degrees F. for 30 minutes. The alkali resistance was run in 3% Rinso soap solutions at 180 degrees F. Duplicate panels were prepared in a similar manner wherein 1% of the sodium salt of dioctyl sulfosuccinate was added to the enamel on the basis of the urea-formaldehyde resins solids content. The following table (Table I) illustrated that with urea-formaldehyde and the sodium salt of dioctyl sulfosuccinate superior results are obtained, and that the improvement is more pronounced at some baking temperatures.

Table I

| Baked 30 Minutes at ° F | 250° | 275° | 300° | 325° |
|---|---|---|---|---|
| Pencil Hardness:[1] | | | | |
| With Catalyst | Very soft | HB | H+ | 2H |
| Without Catalyst | No appreciable difference. | B | HB | H+ |

[1] Order of increasing pencil hardness—4B, 3B, 2B-B, HB, F, H, 2H and 3H.

The following table illustrates the comparative effect of various catalysts upon the urea-formaldehyde of Example I as to pencil hardness, gloss, adhesion and alkali resistance. The tests were made on the enamel composition described.

Table II

| Catalyst and Weight Percentage | Pencil Hardness | Gloss | Adhesion | Alkali Resistance |
|---|---|---|---|---|
| Blank | HB | 84— | Good | 6 hrs. |
| 0.5% dibutyl sodium sulfosuccinate. | H | 83 | Excellent+ | 8 hrs. |
| 1.0% dibutyl sodium sulfosuccinate. | 2H | 82 | do | Do. |
| 0.5% dihexyl sodium sulfosuccinate. | F | 84 | Good+ | Over 10 hrs. |
| 1% dihexyl sodium sulfosuccinate. | F | 84 | do | Do. |
| 0.5% diamyl sodium sulfosuccinate. | H | 84 | do | Over 8 hrs. |
| 1% diamyl sodium sulfosuccinate. | H | 84 | Excellent | Over 10 hrs. |
| 0.5% dioctyl sodium sulfosuccinate. | F | | Excellent— | 7 hrs. |
| 1% dioctyl sodium sulfosuccinate. | F | | do | Do. |
| 1% diallyl sodium sulfosuccinate. | H | | Excellent | Do. |

In the above table it will be noted that the catalyst had no adverse effect upon either the gloss or adhesion, yet the hardness and the resistance to alkali were markedly improved. It will also be observed that there is only a small difference between the various catalysts used as above named. There is some indication that the catalysts containing the shorter length carbon chain ester groups are more effective at a given concentration than those of longer chain length.

EXAMPLE III

In equipment similar to that employed in Example I, 53⅓ parts of urea was added to 168 parts of 37% formaldehyde solution (formalin) in the reaction vessel. The pH was adjusted to 8.8 with small increments of 10% aqueous sodium hydroxide solution. The reaction mass was heated to reflux and held for 30 minutes. After the initial reaction 222 parts of n-butanol and 9 parts of xylene were added and the pH adjusted to 3.4 with phosphoric acid. Water was removed from the mass by azeotropic distillation until the temperature of the distilland reached 212 degrees F., then 1.2 parts of dioctyl sodium sulfosuccinate was added and the refluxing was continued until the temperature approached 234 degrees F., at which time solvent was removed by further distillation until the kettle temperature reached 257 degrees F. A vacuum was drawn over the reaction mass of about 10 mm. of mercury, and the solids concentrated to about 67% non-volatile matter. Forty-eight parts of xylene was added, reducing the solids to about 50%. The Gardner-Holdt viscosity was R and the acid value of the resin solids was found to be 3.

A similar procedure without the use of dioctyl sodium sulfosuccinate gave a product having a viscosity at 50% solids of I (Gardner-Holdt) and an acid value of 2.

The resin prepared by utilization of the catalyst in the cook and the comparative material were compounded with other film-forming materials as in Example II to produce an enamel, identical except for the change in procedure above noted.

Bonderized steel panels were coated by spray application and baked out at 300 degrees F. for ½ hour. The comparative results were as follows:

Table III

| | Pencil Hardness | Adhesion | Alkali Resistance |
|---|---|---|---|
| Catalyst Present | F | Excellent | 8½ hours. |
| Catalyst Absent | HB | Good | 6 hours. |

EXAMPLE IV

Into equipment similar to that employed in Example I, 53⅓ parts of urea and 180 parts of 37% formaldehyde solution were measured. The pH of the solution was adjusted to 8.8 with 10% caustic solution and heated to reflux where it was held for 30 minutes. Three hundred thirty-three parts of isobutyl alcohol and 9 parts of xylene were added to the reaction mass and the pH adjusted to 3.3 with phosphoric acid. The contents of the kettle were then subjected to azeotropic distillation, the water being removed and the xylene-alcohol layer returned to the reaction vessel. After the temperature of the distilland reached 201 degrees F., 1.2 parts of dioctyl sodium sulfosuccinate was added. The distillation was continued until the distillate was free of water, the temperature of the reaction mass being 214 degrees F. Excess isobutyl alcohol was removed until the anhydrous resin solids were 67% of the mass by subjecting the batch to reduced pressure of something less than 50 mm. of mercury. The solids were cut back to 50% with xylene. The viscosity at 50% solids was P(Gardner-Holdt), and the acid value was found to be 2.

A comparable resin, without the presence of the dioctyl sodium sulfosuccinate, was prepared for illustrative purposes. The viscosity was D, and the acid value was 2.

Enamels were prepared as in Example II and were applied over bonderized steel panels and baked out as in Example III. The following table illustrated the advantage of the catalytic method:

Table IV

|  | Pencil Hardness | Gloss | Alkali Resistance |
|---|---|---|---|
| With dioctyl sodium sulfosuccinate | H | 82 | 7 hours. |
| No catalyst | F | 83 | 4 hours. |

EXAMPLE V

By a process similar to Example IV, a urea-formaldehyde resin was prepared in which the sodium dioctyl sulfosuccinate was replaced with dibutyl sodium sulfosuccinate and a blank was run for comparative purposes without the catalyst. The results were as follows:

Table V

|  | Pencil Hardness | Gloss | Adhesion | Alkali Resistance | Acid Value |
|---|---|---|---|---|---|
| With Catalyst | F | 84 | Excellent | 12 hrs | 5 |
| Withoug Catalyst | HB | 85 | Good | 10 hrs | 9 |

EXAMPLE VI

In equipment similar to that used in Example I, 53 parts of dicyandiamide is mixed with 105 parts of 37% formaldehyde solution and the pH adjusted to 8 with 5% sodium hydroxide solution. The resultant mixture is heated to reflux temperature where it is held for about 30 minutes to form the alkylol derivative. Four hundred parts of butyl alcohol and 15 parts of xylene are then added to the reaction mass and the pH adjusted to 4 with phosphoric acid. The contents of the kettle are then subjected to azeotropic distillation, the water being removed and the xylene-alcohol layer being returned to the reaction vessel. Four parts of dioctyl sodium sulfosuccinate are thereupon added and the distillation at atmospheric pressure is continued until the distillate is free from water and the solids content of the resultant solution is approximately 67%. Heating is thereupon discontinued and the product thinned to 50% by weight solids with xylene. At this point, the temperature is approximately 250 degrees F.

The product obtained upon being applied in a film on a bonderized steel panel in an enamel composition similar to that described in Example II and baked out as in Example III was found to possess superior alkali resistance and better adhesion than a comparative resin made as above without the use of the sodium dioctyl sulfosuccinate.

EXAMPLE VII

Sixty-three parts of melamine and 244 parts of formaldehyde solution (37%) are neutralized in a reaction vessel similar to that used in Example I and the pH is then increased to 8 with 5% sodium hydroxide solution. The temperature of the reactants is increased until reflux is started at about 212 degrees F., refluxing continued for 30 minutes. Sufficient phosphoric acid is added to adjust the pH to between 3 and 4, and 400 parts of butyl alcohol and 25 parts of xylene are added. The heating is continued until the reflux condition is again established. The product is azeotropically distilled, the water removed from the condensate and the xylene-alcohol layer returned to the reaction mass. After the temperature of the mass reaches 210 degrees F., 4 parts of sodium dibutyl sulfosuccinate is added and the distillation is continued until the distilland is clear. The resin solids of the batch are thereafter increased by withdrawing the condensate from the vessel under reduced pressure until the solids become approximately 67%. Thereupon the heating is discontinued and the solids cut back with xylene to 50% solids.

A similar batch without the use of the sodium sulfosuccinate ester was made and was found to have less alkali resistance and to require a higher temperature to give equivalent hardness when formulated into an enamel similar to that described in Example II.

EXAMPLE VIII

The following ingredients:

20 parts commercial melamine resin (Resamine 878) [1]
80 parts alkyd varnish described in Example II
0.1 part sulfosuccinate ester salt were mixed together and diluted with sufficient xylene to form a material of dilute viscosity. Tin panels were dipped therein, coated, and allowed to drain. The panels were thereafter baked for 15 minutes at 300 degrees F. The following esters were used in these tests: (a) dibutyl sodium sulfosuccinate, (b) diamyl sodium sulfosuccinate, (c) dioctyl sodium sulfonate and (d) a blank without ester. In each case the melamine formula was harder than the blank. The test illustrated that the catalyst could be added to commercially available melamine resins to obtain superior results.

EXAMPLE IX

An enamel made as in Example II was prepared except that the urea-formaldehyde solution was replaced with the melamine resin of Example VIII (Resamine 878, a product of the Monsanto Chemical Company). One per cent of sodium dioctyl sulfosuccinate was added on the basis of the amine resin solids.

This enamel was applied to bonderized steel panels and baked out at varying temperatures. The data obtained were as shown in the following table:

Table VI

BAKING TEMPERATURE 325° F.

| Pencil Hardness With Catalyst | Time, Minutes | Pencil Hardness Without Catalyst |
|---|---|---|
| F+ | 5 | HB |
| H+ | 10 | H |
| 2H | 15 | H+ |

BAKING TEMPERATURE 225° F.

| 5B+ | 10 | 5B |
| 3B+ | 20 | 3B |
| 2B+ | 30 | 2B |

This table illustrates that the catalyst is effective and gives improved results at temperatures as low as 225 degrees F., and that the improved effectiveness is marked at temperatures as high as 325 degrees F.

EXAMPLE X

One hundred fifty-three parts of 37% formaldehyde solution and 120 parts of paraformaldehyde were weighed into a reaction vessel as in Example I. 67.5 parts of urea were mixed into the first reactants and the pH of the mass was adjusted to 9.7 with 10% caustic soda solution. The mixture was thereafter heated to 70 degrees C. (158 degrees F.) and held for 1 hour. After the initial alkaline condensation, the pH was adjusted to 4.6 with phthalic anhydride. Two hundred parts of n-butanol was added, the temperature was increased to reflux (93 degrees C.–200 degrees F.) and most of the water was removed by azeotropic distillation. The reflux was continued for 2 hours and 118 parts of 2-ethyl hexanol was added after which a clear solution was obtained. The reflux was continued for 2 additional hours. The temperature was 114 degrees C. or 237.2 degrees F. at the end of reflux. The lower boiling solvent was removed by distillation until the temperature of the distilland reached 130 degrees C. The solids at this point were 63% of the total product and the viscosity was W on the Gardner-Holdt scale. The resulting resin was compatible with both xylene and mineral spirits to the extent that one part of resin as above could be admixed with 24 parts of mineral spirits without cloudiness.

[1] A melamine-formaldehyde resin solution containing 50% solids, 15% butyl Cellosolve and 35% butanol and compatible with short and medium length alkyds, both drying and non-drying. This resin has a rapid cure and excellent stability upon age. It is a product of Monsanto Chemical Company, Plastics Division, Springfield, Mass. Other commercial melamine-formaldehyde resins can be used with similar comparative result.

Upon baking out test specimens prepared as in Example VIII on tin panels it was found that the resulting film was too soft for general use. To a portion of the resinous product 1% by weight of dioctyl sodium sulfosuccinate was added and test panels again prepared and baked out comparatively one-half hour at 300 degrees F. By the addition of the catalyst a marked improvement in the hardness of the baked films was obtained.

In the examples given, it will be noted that during the initial condensation which takes place in an aqueous alkaline system, the temperature does not exceed 212 degrees F. because of the presence of the water which is refluxed during the period. It is not essential to go through the step of formation of the alkylol derivative in some instances. This step may be eliminated by the use of a preformed alkylol derivative as, for example, dimethylol urea, formed by an alkali condensation of urea and formaldehyde. When such compounds are used, the initial alkaline condensation may be eliminated. After the alkylol derivative of the amine has formed and the pH reduced to acid conditions, the water is azeotropically removed and the temperature increases as the water content is reduced. The top temperature to which the batch will be taken after the acidification step will depend upon the alcohol selected, whether or not vacuum is used, and the final concentration of resin sought in the ultimate product. Temperatures above 225 degrees F. start to effect a new rate of polymerization due to the catalyst and it is to be noted that at temperatures from 225 degrees F. to 260 degrees F. polymerization progresses with increased rapidity. While the temperature can be increased to 260 degrees F., the time at this temperature should not be unduly prolonged.

Acidification after the initial condensation on the alkaline side is preferably accomplished with a weak acid. Acids within the range of usefulness have been found to possess a dissociation constant in the range of from $2.14 \times 10^{-4}$ to $1.4 \times 10^{-1}$. Acids within this range include formic, malic, citric, salicylic, tartaric, phthalic, orthophosphoric, maleic, oxalic, and pyrophosphoric acids. The preferred acid has been found to be phosphoric acid having a dissociation constant of $1 \times 10^{-2}$. While stronger acids have been used it has been found that the resultant products are less stable with time than those produced as hereinbefore described.

A study of the data presented herein will show that the lower limit of temperature at which the catalyst becomes active depends upon the functionality of the original amino compound used. With melamine condensation, improved effects are noticeable at temperatures as low as 225 degrees F., whereas with the urea types it is desirable to use minimum temperatures of about 250 degrees F. The minimum temperature is also dependent upon the enamel formulation to some extent and upon the characteristics of the resins therein used.

The condensation which occurs under the acidic conditions is normally carried to a stage of water insolubility for use in paints and enamels.

The alkali tests referred to herein were made by submerging test panels of bonderized steel, coated with the finishes to be tested and aged at least 72 hours before making the test, in a 3% aqueous solution of Rinso soap. The thickness of the coating was maintained at from 1½ to 2 mils.

Adhesion was tested by pressing a dull knife blade held normal to the plane of the test surface into the film followed by movement of the blade parallel to the surface tested. This is a practical type test used in the field and the behavior of the knife and the film is indicative of the adhesion obtained.

The pencil hardness test utilizes the difference in hardness degree obtained in the lead of commercial pencils. Standard hardnesses available run from soft to hard in the following steps, 4B, 3B, 2B, B, HB, F, H, 2H and 3H. The pencil lead is drawn over the surface of the cured films. A lead which will scratch the surface of the film is harder than the film and one which will not scratch is softer. By testing, a grade of hardness may be assigned a given film under test.

Other latent catalysts and some containing a sulfonic acid group were tested as potential replacements for the catalysts herein described and were found to be objectionable upon one or more of the following grounds: (1) the acidity of the compound was so great as to cause reaction within the composition during storage at room temperature; (2) the compound was found to be insoluble in the aminoplast condensation product; (3) the compound was sufficiently stable so as to be ineffective as a catalyst within the temperature range useful in curing aminoplast resins; (4) reaction between the aminoplast resin or the alcohol present and the compound caused breakdown of the additive with consequent gelation of the aminoplast composition upon storage; (5) due to the incompatibility of the compound with the aminoplast resin, or other factor, the gloss of the final films was so lowered as to be objectionable; (6) the compound was ineffective in alcohol modified type amino-aldehyde condensations; and (7) the compound discolored the final resin.

The catalysts employed as described herein were found to provide unusual results in that none of the foregoing difficulties occurred in their use, whereas hardness, adhesion and chemical resistance of the final products were markedly improved.

In the foregoing examples the preferred embodiments of our invention have been illustrated. These catalysts are readily available commercially; but it is to be understood that other catalysts, not so readily available commercially, may be substituted therefor including methyl lauryl ammonium sulfofumarate, di (2 ethyl hexyl) potassium sulfosuccinate, monolauryl potassium sulfosuccinate, and methyl ricinoleyl lithium sulfoitaconate.

The term "aminoplast" is a general term for synthetic resins from amino or amide compounds, e. g., urea-formaldehyde. (Chemical and Engineering Dictionary, published by The Chemical Publishing Company of N. Y., Inc., page 7). The expression "amino-aldehyde condensation product" refers to aminoplasts formed by the reaction between an aldehyde and an amino group of an amino compound using the term "amino compound" in the broad sense that an $NH_2$ group is present, as in an amine or certain amide compounds, Thus, urea is said to contain two amino groups and one acid forming group. (Organic Chemistry—Fieser & Fieser, page 244—1944 ed., D. C. Heath & Co.)

By alcohols partially soluble in water it is meant to include aliphatic alcohols having up to 10 carbon atoms in the chain with octyl alcohol representative of a preferred maximum carbon chain length.

The expression "catalytic amount" as employed herein refers to minute amounts of the sulfoesters capable of catalyzing the conversion of the aminoplast resins herein described to an insoluble and infusible form upon heating to temperatures in excess of 225 degrees F.

The term "inert" as employed herein to describe solvents used in the reactions or as a part of the compositions means that the solvents do not take part in any reaction. That is to say they are unreactive or inert.

This application is a continuation-in-part of U. S. Serial Number 92,074, filed May 7, 1949, now abandoned.

We claim:
1. A method of producing improved stable amine-aldehyde resinous condensation products soluble in oleoresinous varnishes which comprises initially condensing under reflux conditions in an aqueous alkaline medium formaldehyde and urea, the molal ratio of the aldehyde to amino groups in the urea being within the ratio from 1:2 to 2:1, adding to the reactants butyl alcohol and a volatile water insoluble aromatic solvent and adjusting the pH to between 3 and 4, subjecting the mass to azeotropic distillation thereby removing the water and returning the aromatic solvent-alcohol layer, meanwhile adding from 0.10% to 5% by weight of the non-volatile mass present of sodium dioctyl sulfosuccinate, continuing to remove volatile components at progressively increasing distillation temperatures at least until the distilland forms a clear, transparent syrup.

2. An essentially anhydrous liquid coating composition soluble in oleoresinous varnishes and insoluble in water which comprises the condensation product of an aldehyde selected from the group consisting of formaldehyde, acetaldehyde, butyraldehyde, furfuraldehyde and benzaldehyde and an amine selected from the class consisting of carbamide, polyamino diazines and polyamino triazines characterized by the presence therein of at least two amino groups possessing replaceable hydrogen atoms terminally condensed under aqueous acidic conditions, the mol ratio of the aldehyde to said amino groups being within the range of from 1:2 to 2:1, containing as the essential ingredient therein a catalytic amount but not more than 5% by weight of the condensation product of an ester of a dicarboxylic acid having the formula

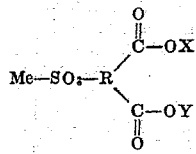

wherein Me is selected from the group consisting of ammonia and salt forming metal ions, R is a saturated aliphatic hydrocarbon group substituted by the sulfonate group on one of the carbon atoms in the positions alpha-beta with respect to the —COOX and —COOY groups but free from other substituents and X and Y are selected from the group consisting of non-substituted and hydroxyl substituted alkenyl, alkyl, aryl and alkaryl groups containing from 1 to 12 carbon atoms.

3. As in claim 2, wherein the ester of the dicarboxylic acid compound is a dialkyl ester of sulfosuccinic acid.

4. As in claim 2, wherein the ester of the dicarboxylic acid compound is the metal salt of a dialkyl ester of sulfosuccinic acid.

5. As in claim 2, wherein the ester of the dicarboxylic acid is the sodium salt of the dioctyl ester of sulfosuccinic acid.

6. A method of producing improved stable alcohol modified amine-aldehyde resinous condensation products soluble in oleoresinous varnishes but insoluble in water which comprises initially condensing under reflux conditions in an aqueous alkaline medium an aldehyde selected from the group consisting of formaldehyde, acetaldehyde, butyraldehyde, furfuraldehyde and benzaldehyde and an amine selected from the class consisting of carbamide, polyamino diazines and polyamino triazines characterized by the presence therein of at least two amino groups possessing replaceable hydrogen atoms, the molal ratio of the aldehyde to said amino groups being within the range of from 1:2 to 2:1, adding to the reactants a modifying alcohol, and a volatile water insoluble aromatic solvent and adjusting the pH to between 3 and 4, subjecting the mass to azeotropic distillation thereby removing the water and returning the aromatic solvent-alcohol layer, meanwhile adding from 0.10% to 5% by weight of the non-volatile mass present of an ester of an aliphatic dicarboxylic acid having the formula

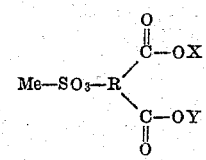

wherein Me is selected from the group consisting of ammonia and salt forming metal ions, R is a saturated aliphatic hydrocarbon group substituted by the sulfonate group on one of the carbon atoms in the positions alpha-beta wtih respect to the —COOX and —COOY groups but free from from other substituents and X and Y are selected from the group consisting of non-substituted and hydroxyl substituted alkenyl, alkyl, aryl and alkaryl groups containing from 1 to 12 carbon atoms, and continuing to remove water and other volatile components at progressively increasing distillation temperatures at least until the distilland forms a clear, transparent syrup.

7. As in claim 6, wherein the ester of the dicarboxylic acid compound is a dialkyl ester of sulfosuccinic acid.

8. As in claim 6, wherein the ester of the dicarboxylic acid compound is a metal salt of the dialkyl ester of sulfosuccinic acid.

9. As in claim 6, wherein the ester of the dicarboxylic acid compound is the alkali metal salt of the dioctyl ester of sulfosuccinic acid.

10. As in claim 6, wherein the acid used for pH adjustment is characterized by a dissociation constant within the range of from $2.14 \times 10^{-4}$ to $1.4 \times 10^{-1}$.

11. As in claim 6, wherein the aldehyde is formaldehyde and the polyamino triazine is melamine.

References Cited in the file of this patent

UNITED STATES PATENTS

| | | |
|---|---|---|
| 2,191,957 | Edgar | Feb. 27, 1940 |
| 2,291,079 | Hofferbert | July 28, 1942 |
| 2,342,641 | Cassell | Feb. 29, 1944 |
| 2,357,273 | Thurston | Aug. 29, 1944 |
| 2,402,032 | Fischer | June 11, 1946 |
| 2,431,035 | Goepfert | Nov. 18, 1947 |
| 2,465,284 | Schmidt | Mar. 22, 1949 |